F. MOSER.
NUT LOCK.
APPLICATION FILED APR. 6, 1917.
1,235,717.
Patented Aug. 7, 1917.
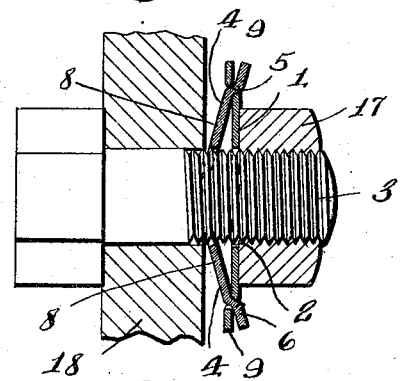
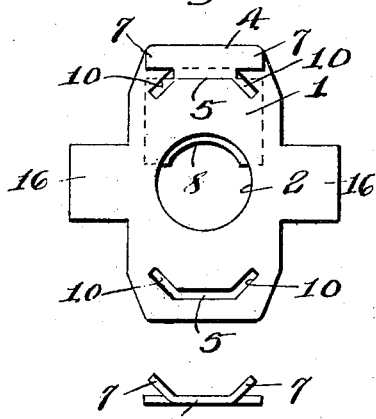
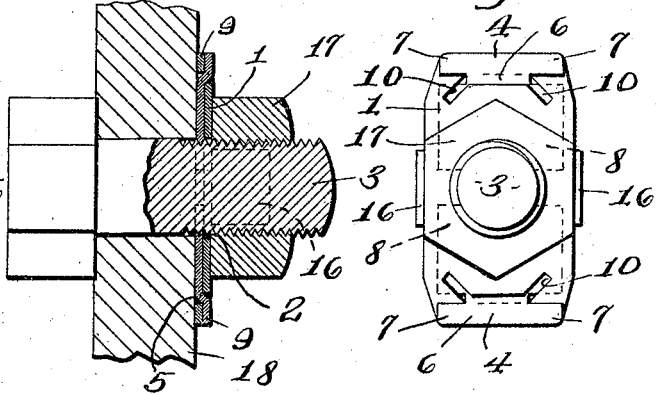
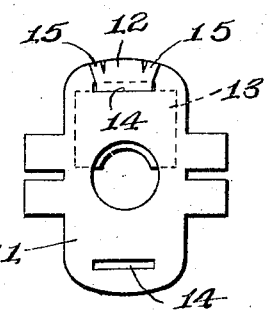
INVENTOR
Fred Moser.
BY
Parsons & Biddle
ATTORNEYS

UNITED STATES PATENT OFFICE.

FRED MOSER, OF AUBURN, NEW YORK, ASSIGNOR OF ONE-HALF TO CHARLES P. BRAIM, OF AUBURN, NEW YORK.

NUT-LOCK.

1,235,717. Specification of Letters Patent. Patented Aug. 7, 1917.

Application filed April 6, 1917. Serial No. 160,101.

*To all whom it may concern:*

Be it known that I, FRED MOSER, a citizen of the United States, and a resident of Auburn, in the county of Cayuga and State of New York, have invented a certain new and useful Nut-Lock, of which the following is a specification.

This invention has for its object the production of a nut lock which is particularly simple in construction, economical in manufacture and highly efficient and durable in use, and which readily unlocks upon turning of the nut by a wrench; and the invention consists in the combinations and constructions hereinafter set forth and claimed.

In describing this invention, reference is had to the accompanying drawings in which like characters designate corresponding parts in all the views.

Figure 1 is a vertical sectional view of my nut lock, the same being shown as in inoperative position on a bolt or screw, the contiguous portion of the bolt or screw being shown in elevation and the nut and a support for the screw or bolt being shown in section.

Fig. 2 is a view similar to Fig. 1 showing the position of the nut lock when in locking position.

Fig. 3 is an elevation looking to the left in Fig. 2, parts being omitted.

Fig. 4 is an elevation of the washer.

Fig. 5 is an end view of one of the locking leaves.

Fig. 6 is a view similar to Fig. 4 of a modified form of this invention.

Fig. 7 is a detail view of the locking leaf shown in Fig. 6.

This nut lock comprises, generally, a base plate or washer, and locking leaves hinged to the base plate and having their free edges remote from their axes movable into engagement with the screw or bolt as the nut is being screwed on the bolt and compresses the locking leaves, so that they move on their hinges from an inclined position to a position flatwise against the body or washer.

1 designates the body plate or washer which is formed with a bolt opening 2 therein of larger diameter than the bolt or screw 3 to which the device is intended to be applied.

4 are the locking leaves, they being here shown as two in number. These leaves are hinged to the washer and movable flatwise toward the same into locking position as shown in Fig. 2 from the position shown in Fig. 1.

As here shown, the washer 1 is formed with transverse slots 5 and each leaf 4 is formed with a tongue 6 extended through one slot and with laterally extending lugs 7 at the ends of the tongue which lugs lap the rear face of the base plate and hold the leaves from detachment.

The leaves at their free ends project at 8 toward the center of the washer beyond the edge of the opening 2 in position to engage the threads of the screw.

These edges are usually arc-shaped. In the form shown in Figs. 1 to 4 inclusive, the washer is formed with offset portions or margins 9 and the slots 5 are formed in the deflections between these offset margins and the body of the washer, that is in the parts connecting the offsets 9 and the body of the washer, the slots having inclined or angular extensions 10 at their opposite ends; and the lugs 7 at the ends of the tongues 6 are formed inclined in order to pass through the inclined extensions 10, so that when the parts are assembled the tongue and the lugs can be passed through the slot 5 and the inclined extensions 10 thereof, and thereafter the lugs 7 bent into the plane of the leaf.

In Figs. 6 and 7 the washer 11 is formed flat with no offset and after the tongue 12 of the leaf 13 has been passed through the slot 14 in the washer, the end of the tongue is spread slightly as at 15 by striking the same with a hammer or in any other suitable manner.

The washers are provided with suitable ears 16 which are folded over onto the nut in the usual manner after the nut has been turned to its final position.

In operation, the washer or plate 1 with the leaves 4 attached thereto is placed on the bolt and as the nut 17 is turned on the bolt the ends of the leaves 4 engage the support 18 toward which the nut is being turned, so that continued movement of the nut causes the leaves to flatten toward the washer from the position shown in Fig. 1 to that shown in Fig. 2 causing the free edges of the leaves to be cut into by the threads of the bolt.

Owing to the use of the slots, the washer may stretch slightly while the leaves are flattening toward the plane of the washer. When the bolt is unscrewed the locking leaves readily release themselves from the bolt, and the nut lock can be again used without readjustment except, of course, the folding of the ears 16.

What I claim is:

1. A nut lock comprising a washer, and a leaf hinged to the washer at one side of the opening thereof and movable on its axis flatwise toward the washer, the leaf having its free edge arranged to extend beyond the edge around the opening of the washer and toward the center of said opening, substantially as and for the purpose described.

2. A nut lock comprising a washer, and a leaf hinged to the washer at one side of the opening of the washer and movable on its hinge flatwise toward the washer, and the leaf having an arc-shaped free edge arranged nearer the axis of the central opening than the edge of the washer around said opening, substantially as and for the purpose specified.

3. A nut lock comprising a washer and opposing leaves hinged to the washer on opposite sides of the opening of the washer and movable flatwise against the washer, the leaves having their opposing edges extending inwardly beyond the edge of the washer around said opening, substantially as and for the purpose set forth.

4. A nut lock comprising a washer formed with a slot at one side of its opening, and a leaf having a tongue extended through the slot whereby the leaf is hinged to the washer, the leaf being movable flatwise toward the washer and extending toward the axis of the washer, substantially as and for the purpose described.

5. A nut lock comprising a washer formed with slots on opposite sides of its opening, folding leaves having tongues extending respectively through said slots and hinging the leaves to the washer, the leaves extending from the slots toward the center of the washer and being movable flatwise toward the washer and having arc-shaped inner edges, substantially as and for the purpose specified.

6. A nut lock comprising a washer having a slot at one side of its opening, a leaf having a tongue extending through the slot and laterally extending lugs at opposite sides of the tongue near the end thereof for preventing movement of the tongue out of the slot, the leaf being foldable flatwise toward the washer and having its free edge extending toward the center of the opening of the washer beyond the edge of the washer around said opening, substantially as and for the purpose described.

7. A nut lock comprising a washer with an offset portion at one side of its opening and also with a slot formed in the deflection between the offset portion and the body of the washer, the slot having angular extensions at its ends, a folding leaf having a tongue extended through the main portion of the slot and laterally extending lugs at opposite sides of the end of the tongue, the leaf being foldable toward the body plate and having its free edge extending beyond the edge of the opening of the washer, substantially as and for the purpose set forth.

In testimony whereof, I have hereunto signed my name, at Auburn, in the county of Cayuga, and State of New York, this 22 day of March, 1917.

FRED MOSER.

Copies of this patent may be obtained for five cents each, by addressing the "Commissioner of Patents, Washington, D. C."